Patented May 27, 1947

2,421,154

UNITED STATES PATENT OFFICE 2,421,154

ALUMINUM POWDER AND RESIN SPOT FACING MATERIAL

Curtis E. Maier, Elmhurst, Ill., assignor to Continental Can Company, Inc., New York, N. Y., a corporation of New York No Drawing. Application June 22, 1943, Serial No. 491,856

6 Claims. (Cl. 117—160)

In making crown seal closures for beer and like fermented lower alcohol beverages such as ale, stout and porter, it has been a practice to employ aluminum foil pads .002 of an inch thick as a spot to prevent contact of the beer with the cork or other resilient pad employed in the closure. The effective surface presented to the beer is the flat area of the sheet. Further, owing to existing restrictions, aluminum foil is not available for employment.

In preparing spots for crown caps and like closures, it has been proposed to utilize various resins as substitutes, but many of these substitutes have the difficulty of vapor and gas penetration. During the course of the shelf life of the beer in the bottle (say, 1 to 6 months), the beer gradually attains a darker color and may become cloudy, partly inherently and partly due to the absorption of matters coming from the cork pad. This is disadvantageous with certain types of beer which are appreciated for their fine light golden color. The resins for this purpose must be selected for their attributes of stability against causing deleterious flavor formation in the beverage, their capacity of easy working and resistance for providing and maintaining the requisite film, and their ability to withstand action by aqueous and alcoholic fluids and by the dissolved and suspended matters.

It has now been found that a spot formed of a semi-permeable resin film and having aluminum powder incorporated therein has the capacity of protecting the beer against darkening, by exerting a mild bleaching effect due to the penetration of vapors and gases through the resin; and that the presence of the aluminum powder operates to reduce the rate and extent of penetration so that the desired effect can be exerted over the expected shelf life of the beer. The aluminum powder has a surface area which is many times greater than the simple flat area; but the prevailing effect is limited by the slow penetration of moisture and gas constituents through the resin film to the paper and then back to the general container contents, and moreover the slowness of the action permits the effect to be continued over a long time, particularly as the resinous film tends to reduce the formation of protective oxide and carbonate films on the surface of the aluminum particles. By comparison, it may be pointed out that this bleaching effect is essentially absent from spots made of aluminum foil, as the effective surface of the spot is essentially the flat area thereof and does not have a sufficient exposure of aluminum metal to accomplish the effect over the shelf life of the beer.

A suitable resin for the purpose is a copolymer or a mixture of polymers of vinyl halide with vinyl esters, vinyl butyral, acrylic esters, etc., with a proportion of vinyl halide of 60 percent or more; a halogenated rubber compound such as a rubber hydrochloride resin or chlorinated rubber; or a baked oleoresinous varnish. The material is prepared with the aluminum powder either by hot milling or by forming a solution and introducing the powder thereto.

The composition may be employed as an extruded sheet or as a film applied to a paper backing or support. The sheet material is cut to form the spots and is then applied to the backing or cushion pad by a suitable cement. Suitable backs or cushion pads may be formed from cork, cork board, paper board, felt board, and the like.

It is preferred to employ the aluminum powder in the form of leaves or flakes rather than in the form of spherical granules, as the presence of the particles in the film then operates to restrict the movement of the gases and vapors to tortuous paths, so that the rate of penetration is reduced and the material is effective over long periods of time.

The presence of the particles also confers a covering power upon the spot, so that a better appearance is presented in commercial use, as any discoloration of the cushion pad, by reason of ultimate penetration thereto of the contents of the container, is hidden, and such aging effect or the presence of a pinhole in the film does not cause the development of a visually objectionable dark color.

As examples of practice of the invention may be set out:

Example I 63 to 85 parts by weight of vinyl polymer resin (such as a copolymer containing 87 percent vinyl chloride and 13 percent vinyl acetate) is mixed with 15 to 25 parts of a suitable plasticizer such as dibutyl phthalate and 1 to 10 percent of a wax such as ceresin and 1 to 20 parts of flake aluminum powder. The premixed ingredients are worked in the rubber calendering roll, preferably with slight heating of the roll, until the composition is a warm homogeneous plastic mass. This plastic mass is then extruded between calendering rolls to form a film of the desired thickness, such as one to five thousandths (0.001 to 0.005) of an inch, being by present preference about eighteen to twenty-two ten-thousandths (0.0018 to 0.0022). The hot extruded film, immediately upon emerging from the calendering roll, is brought into contact with a web of paper traveling at the same speed, and the paper and vinyl resin film are immediately run through a pair of warm calendering rolls to cause the film to be thermoplastically bonded to the paper. In this way, a surfaced paper is formed which has a total thickness of, say, five to eight thousandths (0.005 to 0.008) of an inch, and has the appearance of being coated with a thin aluminum foil.

This coated paper can be formed into spots and applied to the cushion pad of the crown seals by utilizing a thermoplastic cement, preferably one such as gutta percha, which is tacky at a temperature between 130 and 300 degrees F., i. e., below the temperature of thermoplasticity of the vinyl resin.

It is also feasible to employ the extruded film without a paper backing, by supporting it upon a web of glassine paper until it has cooled essentially to room temperature, at which time the vinyl resin coating may be stripped from the glassine web and the latter re-used. This extruded material can be employed by cutting to form spots and applying these spots to the cushion pads.

It is feasible prior to the complete cooling of the material to apply a layer of gutta percha or other low-fusible composition to the paper backing or to an exposed surface of the extruded bare film, and to roll this to the desired uniformity and thickness. When this layer has been so employed, the spots may be cut from the sheet material, and then caused to adhere to the cushion pads of the lining of crown caps or the like by heating to a temperature at which the adhesive is tacky.

In lieu of the 87:13 vinyl chloride-acetate polymer resin, other vinyl halide-ester resins may be employed containing 60 to 100 percent of vinyl halide in the polymer; or such vinyl halide-ester resins containing modifiers such as intercondensible modifiers of polyvalent acid or acid anhydride type, for example Vinylite VMCH is a suitable polymerized vinyl chloride-acetate containing about 2 percent of maleic anhydride in the polymer. Polyvinyl acetate, polyvinyl alcohol, and polyacrylic esters per se are excluded due to poor resistance to water penetration and water absorption. The vinyl resin may be taken up in a suitable volatile solvent and thus applied to a backing sheet, and then baked.

Example II

Rubber hydrochloride resin is dissolved in a solvent containing a chlorinated hydrocarbon, to form a solution having 5 to 15 parts by weight of the rubber hydrochloride. This solution is mixed with 1 to 20 percent of aluminum flake powder, by weight of the solid constituents of the solution. This material is then coated onto the surface of a large heated drum which provokes the evaporation of the solvent. The solvent-free deposit is then stripped from the drum as a film having a thickness of the order of one to three thousandths (0.001 to 0.003) of an inch.

Suitable solvent-type plasticizers, such as dibutyl phthalate, diamyl phthalate, dibutyl cellosolve phthalate, and the like may be introduced in the solution to confer the desired characteristics of toughness, workability and solvent nonpermeability upon the base or film forming constituents.

As the film is taken from the drum, it may be brought into contact with a web of paper as described in Example I above, and bonded thereto by passage through heated calendering rolls, by employing a solvent for rendering the material tacky, or by utilizing an alkyd adhesive, rubber cement, wax resin adhesive, or the like.

As in Example I, an adhesive layer may be applied, such as gutta percha.

The coated material may then be employed as described above for spots.

Example III

An oleoresinous varnish base is prepared from 100 parts by weight of China-wood oil, 100 parts of a resin which is a glycerol ester of rosin and maleic anhydride (Beckacite No. 1111), one part of manganese resinate, 200 parts by weight of xylol as a volatile aromatic solvent. This coating composition is applied to one side of drab express paper (0.005 of an inch thick), is air-dried, and then is baked for 40 minutes at 350 degrees F. A second varnish base, of the same ingredient proportions, is prepared with 10 pounds of aluminum powder thoroughly stirred into it, and is employed for a second coating on the same side of the paper, being air-dried and baked as before. The two coats total 20 to 40 milligrams per square inch of dried film weight. This material is opaque and has the appearance of aluminum foil, along with a lower moisture transmission than is provided in the absence of the aluminum powder and with the desirable characteristic of the limited bleaching effect.

Example IV

A drab express paper (0.005 of an inch thick) is coated on one side as in Example III with one coat of a clear oleoresinous varnish base, to give a dry film weight of 10 to 20 milligrams per square inch. The same side of the paper is then coated with an aluminum-pigmented vinyl resin lacquer and baked for five minutes at 300 degrees F. to provide a dry film weight of baked vinyl lacquer of 4 to 6 milligrams per square inch. A suitable vinyl lacquer solution consists of 16 pounds of vinyl resin (copolymer containing 87 percent vinyl chloride and 13 percent vinyl acetate), ½ pound of aluminum powder, 2 pounds of dibutyl cellosolve phthalate, 8½ pounds of methyl isobutyl ketone, 36½ pounds of methyl ethyl ketone, and 36½ pounds of toluol.

The size coat gives a good resistance to permeability of moisture and gas, and the aluminum-pigmented vinyl resin top coat gives the desired bleaching and clarifying action on the beer, etc., as well as preventing any deleterious effect of the oleoresin on the beer, such as imparting off-flavors particularly on long storage, with some beer.

Spots cut from the materials of Examples III and IV may be used as described above.

In lieu of the China-wood oil, other drying oils such as bodied linseed oil, dehydrated castor oil, etc., which may be baked and polymerized to water-resistant films, may be employed. Other resins of thermoplastic character, which have the requisite resistance to water penetration and water absorption, may be substituted for the maleic resin, such as other polyalcohol-polyacid alkyd resins, unmodified or modified phenolaldehyde resins, etc. The solvent may be an aromatic or aliphatic hydrocarbon or a mixture of such hydrocarbons, having an appropriate boiling point to assure elimination during the baking. While the above prescription recommends the employment of a clear coating followed by an aluminum-pigmented coating, the aluminum-pigmented composition may be employed for both coatings, and the quantity of aluminum may vary from 1 to 20 percent of the composition.

As with Examples I and II, the sheet materials may be provided with a thermo-adhesive substance such as gutta percha before being formed into spots for application to the cushion pads.

The aforesaid sheet materials have the characteristic of the strength of the vinyl resin or other solid resinous base, for permitting yielding of the spots under the conditions of closure. With the employment of cork for the cushion pads, a cork disk having an original thickness of 1/16 of an inch may be pressed to 2/100 of an inch when applied to a bottle or other container, but the aforesaid sheet materials yield under such conditions and conform to the mouth of the container without being torn or disrupted under the strains imposed.

The sheet materials formed by extruding and bonding on paper, or by coating paper with a solution containing the base and having the aluminum powder dispersed therein, may be subjected to baking operations at temperatures between 285 and 350 degrees F. for establishing the elimination of existing solvents or flavor-forming substances and to secure the polymerization or setting of the film. The presently preferred temperature is around 300 to 350 degrees F., to assure against deterioration of the molecular structure of the paper, when the entire material is subjected to the baking operation. When infra-red light is employed for the baking, the effective temperature within the film may be increased, as the paper itself is then not subjected as a body to such high temperatures.

It is presently preferred to provide about one-twelfth milligram of aluminum flake powder per square inch per .0001 of an inch film thickness, using the flakes obtainable commercially; although essentially similar results may be obtained with one twenty-fifth to one-fifth milligram, with normal sizes of beer bottles closed by crown closures.

It is obvious that the invention may be practiced in many ways within the scope of the appended claims.

I claim:

1. A flexible closure liner facing material for beer containers, consisting of a non-metallic base having thereon an adherent coating exposed to the beer and consisting essentially of water-insoluble and beer-nonreactive semi-permeable resin material and 1 to 20 percent of aluminum flake powder distributed throughout the resin material, the aluminum flakes being enclosed in the resin and being effective to reduce the rate of permeation of moisture and gas constituents of the beer into the coating and effective when the liner is exposed to beer to produce, through the slow penetration of the vapor and gas constituents from the beer through the resin and back to the general container contents, a bleaching action restricted by the effect of said resin whereby to offset darkening of color and development of cloudiness in the beer during its shelf life.

2. A flexible closure liner facing material for beer containers, consisting of a paper base having thereon an adherent coating exposed to the beer and consisting essentially of water-insoluble and beer-nonreactive semi-permeable plasticized polyvinyl halide-acetate resin containing at least 60 percent of vinyl halide in the polymer, and 1 to 20 percent of aluminum flake powder distributed throughout the film to provide one twenty-fifth to one fifth milligram of aluminum flakes per square inch per one ten-thousandth of an inch thickness of the resin coating, said coating having a total thickness of substantially one to three thousandths of an inch; the aluminum flakes being enclosed in the resin and being effective to reduce the rate of permeation of moisture and gas constituents of the beer into the coating and effective when the liner is exposed to beer to produce, through the slow penetration of the vapor and gas constituents from the beer through the resin and back to the general container contents, a bleaching action restricted by the effect of said resin whereby to offset darkening of color and development of cloudiness in the beer during its shelf life.

3. A flexible closure liner facing material for crown closures for beer containers, consisting of a paper base having thereon an adherent coating exposed to the beer and consisting essentially of a water-insoluble and beer-nonreactive resinous base consisting of 63 to 85 parts by weight of polyvinyl halide-acetate resin containing substantially 87 percent of vinyl halide in the polymer and mixed therewith substantially 15 to 25 parts of a plasticizer, and 1 to 20 parts of aluminum flake powder distributed throughout the resinous base; said coating having a total thickness of substantially one to five thousandths of an inch, the aluminum flakes being present substantially in the proportion of one-twelfth milligram per square inch per ten-thousandths of an inch of thickness of the said resinous base coating, the aluminum flakes being enclosed in the resin and being effective to reduce the rate of permeation of moisture and gas constituents of the beer into the coating and effective when the liner is exposed to beer to produce, through the slow penetration of the vapor and gas constituents from the beer through the resin and back to the general container contents, a bleaching action restricted by the effect of said resin whereby to offset darkening of color and development of cloudiness in the beer during its shelf life.

4. A flexible spot for crown closures for beer containers, consisting of a paper base having on one face thereof an adherent coating exposed to the beer and consisting essentially of a water-insoluble and beer-nonreactive resinous base consisting of 63 to 85 parts by weight of polyvinyl halide-acetate resin containing substantially 87 percent of vinyl halide in the polymer and mixed therewith substantially 15 to 25 parts of a plasticizer, and 1 to 20 parts of aluminum flake powder distributed throughout the resinous base, said coating becoming thermoplastic at a temperature above 300 degrees F., and an adherent layer of adhesive material which becomes tacky at a temperature between 130 and 300 degrees F. and below the temperature of thermoplasticity of the resinous base; said coating having a total thickness of substantially one to five thousandths of an inch, the aluminum flakes being present substantially in the proportion of one-twelfth milligram per square inch per ten-thousandths of an inch of thickness of the said resinous base coating, the aluminum flakes being enclosed in the resin and being effective to reduce the rate of permeation of moisture and gas constituents of the beer into the coating and effective when the liner is exposed to beer to produce through the slow penetration of the vapor and gas constituents from the beer through the resin and back to the general container contents to cause a bleaching action restricted by the effect of said resin whereby to offset darkening of color and development of cloudiness in the beer during its shelf life.

5. A flexible closure liner facing material for beer containers, consisting of a non-metallic base having thereon an adherent coating exposed to the beer and consisting essentially of water-insoluble and beer-nonreactive semi-permeable resin material basically composed of halogenated rubber resin and 1 to 20 per cent of aluminum flake powder distributed throughout the resin material to provide one twenty-fifth to one-fifth milligram of aluminum flakes per square inch per one ten-thousandth of an inch thickness of the resin coating, said coating having a total thickness of substantially one to three thousandths of an inch; the aluminum flakes being enclosed in the resin and being effective to reduce the rate of permeation of moisture and gas constituents of the beer into the coating and effective when the liner is exposed to beer to produce, through the slow penetration of the vapor and gas constituents from the beer through the resin and back to the general container contents, a bleaching action restricted by the effect of said resin whereby to offset darkening of color and development of cloudiness in the beer during its shelf life.

6. A flexible closure liner facing material for beer containers, consisting of a non-metallic base having thereon an adherent coating exposed to the beer and consisting essentially of water-insoluble and beer-nonreactive semi-permeable resin material basically composed of rubber hydrochloride and 1 to 20 percent of aluminum flake powder distributed throughout the resin material to provide about one twelfth milligram of aluminum flakes per square inch per one ten-thousandth of an inch thickness of the resin coating, said coating having a total thickness of substantially one to three thousandths of an inch; the aluminum flakes being enclosed in the resin and being effective to reduce the rate of permeation of moisture and gas constituents of the beer into the coating and effective when the liner is exposed to beer to produce, through the slow penetration of the vapor and gas constituents from the beer through the resin and back to the general container contents, a bleaching action restricted by the effect of said resin whereby to offset darkening of color and development of cloudiness in the beer during its shelf life.

CURTIS E. MAIER.

REFERENCES CITED

The following references are of record in the file of this patent:

UNITED STATES PATENTS

| Number | Name | Date |
| --- | --- | --- |
| 2,300,373 | Stoner | Oct. 27, 1942 |
| 1,899,782 | Warth | Feb. 28, 1933 |
| 2,111,058 | Winklemann | Mar. 15, 1938 |
| 2,234,317 | Pfeiffer | Mar. 11, 1941 |
| 2,054,454 | Thies | Sept. 15, 1936 |
| 2,111,395 | Hartwick | Mar. 15, 1938 |
| 1,699,274 | Bohart | Jan. 15, 1929 |